United States Patent
Liu et al.

(10) Patent No.: US 10,608,249 B2
(45) Date of Patent: Mar. 31, 2020

(54) CONFORMAL COATING OF LITHIUM ANODE VIA VAPOR DEPOSITION FOR RECHARGEABLE LITHIUM ION BATTERIES

(71) Applicants: GM Global Technology Operations LLC, Detroit, MI (US); The Regents of the University of California, Oakland, CA (US)

(72) Inventors: Fang Liu, Los Angeles, CA (US); Duo Xu, Los Angeles, CA (US); Yunfeng Lu, Los Angeles, CA (US); Qiangfeng Xiao, Troy, MI (US); Mei Cai, Bloomfield Hills, MI (US)

(73) Assignees: GM GLOBAL TECHNOLOGY OPERATIONS LLC, Detroit, MI (US); THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 157 days.

(21) Appl. No.: 15/666,170

(22) Filed: Aug. 1, 2017

(65) Prior Publication Data
US 2019/0044134 A1    Feb. 7, 2019

(51) Int. Cl.
*H01M 4/04* (2006.01)
*H01M 4/38* (2006.01)
(Continued)

(52) U.S. Cl.
CPC .......... *H01M 4/382* (2013.01); *H01M 4/0428* (2013.01); *H01M 4/134* (2013.01);
(Continued)

(58) Field of Classification Search
CPC .... H01M 4/0428; H01M 4/366; H01M 4/382; H01M 2220/20; H01M 2004/027
See application file for complete search history.

(56) References Cited

U.S. PATENT DOCUMENTS 8,663,840 B2    3/2014    Nazri et al.
8,974,946 B2    3/2015    Cai et al.
(Continued)

FOREIGN PATENT DOCUMENTS

CN    101872872 A    10/2010
CN    105703005    *    6/2016
(Continued)

OTHER PUBLICATIONS

English translation of CN Publication 105703005, Jun. 2016.*
(Continued)

*Primary Examiner* — Brittany L Raymond
(74) *Attorney, Agent, or Firm* — Harness, Dickey & Pierce, P.L.C.

(57) ABSTRACT

A negative lithium-containing electrode for an electrochemical cell is provided, along with methods of making such a negative lithium-containing electrode. The method includes depositing a first precursor and a second precursor in a vapor deposition process onto one or more surface regions of a negative electrode material comprising lithium. The first precursor and the second precursor react to form an inorganic-organic composite surface coating on the one or more surface regions. The first precursor comprises an organic mercapto-containing silane and the second precursor comprises an inorganic silane.

20 Claims, 5 Drawing Sheets

(51) Int. Cl.
*H01M 4/36* (2006.01)
*H01M 4/1395* (2010.01)
*H01M 10/42* (2006.01)
*H01M 4/134* (2010.01)
*H01M 4/62* (2006.01)
*H01M 4/02* (2006.01)

(52) U.S. Cl.
CPC ......... *H01M 4/1395* (2013.01); *H01M 4/366* (2013.01); *H01M 4/628* (2013.01); *H01M 10/4235* (2013.01); *H01M 2004/027* (2013.01); *H01M 2220/20* (2013.01)

(56) References Cited

U.S. PATENT DOCUMENTS

| | | | |
|---|---|---|---|
| 8,999,584 B2 | 4/2015 | Jiang et al. | |
| 9,028,565 B2 | 5/2015 | Huang | |
| 9,093,705 B2 | 7/2015 | Xiao et al. | |
| 9,123,939 B2 | 9/2015 | Xiao et al. | |
| 9,142,830 B2 | 9/2015 | Xiao et al. | |
| 9,153,819 B2 | 10/2015 | Huang et al. | |
| 9,160,036 B2 | 10/2015 | Yang et al. | |
| 9,252,411 B2 | 2/2016 | Abd Elhamid et al. | |
| 9,302,914 B2 | 4/2016 | Liu et al. | |
| 9,350,046 B2 | 5/2016 | Huang | |
| 9,362,551 B2 | 6/2016 | Sachdev et al. | |
| 9,362,552 B2 | 6/2016 | Sohn et al. | |
| 9,412,986 B2 | 8/2016 | Huang | |
| 9,437,871 B2 | 9/2016 | Zhou et al. | |
| 9,537,144 B2 | 1/2017 | Huang et al. | |
| 9,742,028 B2 | 8/2017 | Zhou et al. | |
| 9,896,763 B2 | 2/2018 | Dadheech et al. | |
| 2007/0287070 A1 | 12/2007 | Okumura et al. | |
| 2009/0155598 A1* | 6/2009 | Bierwagen | C09D 5/08 428/418 |
| 2010/0273048 A1 | 10/2010 | Machida et al. | |
| 2012/0229096 A1 | 9/2012 | Nazri | |
| 2012/0231321 A1 | 9/2012 | Huang et al. | |
| 2013/0284338 A1 | 10/2013 | Xiao et al. | |
| 2014/0265557 A1 | 9/2014 | Huang et al. | |
| 2014/0272526 A1 | 9/2014 | Huang | |
| 2014/0272558 A1 | 9/2014 | Xiao et al. | |
| 2015/0014890 A1 | 1/2015 | Xiao | |
| 2015/0056387 A1 | 2/2015 | Dadheech et al. | |
| 2015/0056493 A1 | 2/2015 | Dadheech et al. | |
| 2015/0056507 A1 | 2/2015 | Dadheech et al. | |
| 2015/0056517 A1 | 2/2015 | Zhou et al. | |
| 2015/0104690 A1 | 4/2015 | Xiao et al. | |
| 2015/0162583 A1 | 6/2015 | Dadheech et al. | |
| 2015/0162602 A1 | 6/2015 | Dadheech et al. | |
| 2015/0236324 A1 | 8/2015 | Xiao et al. | |
| 2015/0349307 A1 | 12/2015 | Dadheech et al. | |
| 2016/0020491 A1 | 1/2016 | Dai et al. | |
| 2016/0111721 A1 | 4/2016 | Xiao et al. | |
| 2016/0141598 A1 | 5/2016 | Dai et al. | |
| 2016/0172665 A1 | 6/2016 | Zhou et al. | |
| 2016/0172681 A1 | 6/2016 | Yang et al. | |
| 2016/0172706 A1 | 6/2016 | Xiao et al. | |
| 2016/0172710 A1 | 6/2016 | Liu et al. | |
| 2016/0218342 A1 | 7/2016 | Xiao et al. | |
| 2016/0254567 A1 | 9/2016 | Cai et al. | |
| 2016/0351973 A1* | 12/2016 | Albano | H01M 4/366 |
| 2017/0141382 A1 | 5/2017 | Dadheech et al. | |
| 2017/0141383 A1 | 5/2017 | Dadheech et al. | |
| 2017/0162859 A1 | 6/2017 | Yang et al. | |
| 2017/0214079 A1 | 7/2017 | Dai et al. | |
| 2017/0222210 A1 | 8/2017 | Xiao | |
| 2017/0271678 A1 | 9/2017 | Yang et al. | |
| 2017/0288230 A1 | 10/2017 | Yang et al. | |
| 2017/0338490 A1 | 11/2017 | Xiao et al. | |
| 2018/0048022 A1 | 2/2018 | Yang et al. | |
| 2018/0287207 A1 | 10/2018 | Dai et al. | |
| 2018/0309165 A1 | 10/2018 | Yersak et al. | |
| 2018/0309166 A1 | 10/2018 | Yersak et al. | |
| 2018/0375148 A1 | 12/2018 | Yersak et al. | |

FOREIGN PATENT DOCUMENTS

| | | |
|---|---|---|
| CN | 105703005 A | 6/2016 |
| CN | 109326770 A | 2/2019 |
| DE | 102015121310 A1 | 6/2016 |
| DE | 102018118730 A1 | 2/2019 |
| JP | H0982313 A | 3/1997 |
| KR | 20120079395 A | 7/2012 |
| KR | 1020120080831 A | 7/2012 |
| WO | WO-2014182281 A1 | 11/2014 |
| WO | WO-2015126649 A1 | 8/2015 |

OTHER PUBLICATIONS

First Office Action for Chinese Application No. 201510910062.0 dated Sep. 29, 2017; 7 pages.

Li Yang et al.; U.S. Appl. No. 15/070,677, filed Mar. 15, 2016, entitled "Primer Surface Coating for High-Performance Silicon-Based Electrodes"; 50 pages.

Li Yang et al.; U.S. Appl. No. 15/085,510, filed Mar. 30, 2016 entitled "Negative Electrode Including a Polymeric Single-Ion Conductor Coating"; 25 pages.

Li Yang et al.; U.S. Appl. No. 15/237,378, filed Aug. 15, 2016 entitled "Gel Electrolytes and Precursors Thereof"; 23 pages.

Xingcheng Xiao et al.; U.S. Appl. No. 15/160,377, filed May 20, 2016 entitled "Polymerization Process for Forming Polymeric Ultrathin Conformal Coatings on Electrode Materials"; 45 pages.

Gayatri V. Dadheech et al.; U.S. Appl. No. 15/154,358, filed May 13, 2016 entitled "Novel Particle Reactor for Atomic Layer Deposition (ALD) and Chemical Vapor Deposition (CVD) Processes"; 38 pages.

J. G. Zhang et al.; "Lithium Metal Anodes and Rechargeable Lithium Metal Batteries"; Chapter 2, Characterization and Modeling of Lithium Dendrite Growth; Springer Series in Materials Science 249, DOI 10.1007/978-3-319-44054-5_2; Springer International Publishing Switzerland 2017; 40 pages.

Chung, Kwang-il et al.; "Lithium Phosphorous Oxynitride as a Passive Layer for Anodes in Lithium Secondary Batteries"; Journal of Electroanalytical Chemistry 566 (2004); pp. 263-267.

Kozen, Alexander C. et al.; "Next-Generation Lithium Metal Anode Engineering via Atomic Layer Deposition"; ACS Nano; vol. 9; No. 6; May 13, 2015; pp. 5884-5892.

* cited by examiner

I.

II.

R=-CH₃,-CH₂CH₃
X=-OCH₂CH₃,-CH₂CH₂SLi

CONFORMAL COATING OF LITHIUM ANODE VIA VAPOR DEPOSITION FOR RECHARGEABLE LITHIUM ION BATTERIES

This section provides background information related to the present disclosure which is not necessarily prior art.

The present disclosure pertains to a negative lithium-containing electrode for an electrochemical cell, along with methods of making such a negative lithium-containing electrode by a vapor deposition process of at least two distinct precursors on one or more surface regions of a negative electrode material comprising lithium, wherein the precursors react to form an inorganic-organic composite surface coating on the one or more surface regions.

High-energy density, electrochemical cells, such as lithium-ion batteries can be used in a variety of consumer products and vehicles, such as Hybrid Electric Vehicles (HEVs) and Electric Vehicles (EVs). Typical lithium-ion, lithium sulfur, and lithium-lithium symmetrical batteries include a first electrode, a second electrode, an electrolyte material, and a separator. One electrode serves as a positive electrode or cathode and another serves as a negative electrode or anode. A stack of battery cells may be electrically connected to increase overall output. Conventional rechargeable lithium-ion batteries operate by reversibly passing lithium-ions back and forth between the negative electrode and the positive electrode. A separator and an electrolyte are disposed between the negative and positive electrodes. The electrolyte is suitable for conducting lithium-ions and may be in solid (e.g., solid state diffusion) or liquid form. Lithium-ions move from a cathode (positive electrode) to an anode (negative electrode) during charging of the battery, and in the opposite direction when discharging the battery.

Many different materials may be used to create components for a lithium-ion battery. Common negative electrode materials include lithium insertion materials or alloy host materials, like carbon-based materials, such as lithium-graphite intercalation compounds, or lithium-silicon compounds, lithium-tin alloys, and lithium titanate $Li_{4+x}Ti_5O_{12}$, where $0 \leq x \leq 3$, such as $Li_4Ti_5O_{12}$ (LTO). Where the negative electrode may also be made of metallic lithium, so that the electrochemical cell is considered a lithium metal battery or cell. Metallic lithium for use in the negative electrode of a rechargeable battery has various potential advantages, including having the highest theoretical capacity and lowest electrochemical potential. Thus, batteries incorporating lithium metal anodes can have a higher energy density that can potentially double storage capacity, so that the battery may be half the size, but still last the same amount of time as other lithium ion batteries. Thus, lithium metal batteries are one of the most promising candidates for high energy storage systems. However, lithium metal batteries also have potential downsides, including possibly exhibiting unreliable or diminished performance and potential premature electrochemical cell failure.

There are two primary causes for performance degradation with lithium negative electrodes. Side reactions can occur between the lithium metal and species in the adjacent electrolyte disposed between the positive and negative electrodes, which can compromise coulombic efficiency and cycling lifetime of rechargeable lithium batteries. Also, when the lithium metal is recharged, branchlike or fiber-like metal structures, called dendrites, can grow on the negative electrode. The metal dendrites may form sharp protrusions that potentially puncture the separator and cause an internal short circuit, which may cause cell self-discharge or cell failure through thermal runaway. Accordingly, it would be desirable to develop reliable, high-performance lithium-containing negative electrode materials for use in high energy electrochemical cells that reduce or suppress lithium metal dendrite formation.

SUMMARY

This section provides a general summary of the disclosure, and is not a comprehensive disclosure of its full scope or all of its features.

In various aspects, the present disclosure provides a method of making a negative lithium-containing electrode for an electrochemical cell. In one variation, the method includes depositing a first precursor and a second precursor in a vapor deposition process onto one or more surface regions of a negative electrode material including lithium. The first precursor includes an organic mercapto-containing silane and the second precursor includes an inorganic silane. The first precursor and the second precursor react to form an inorganic-organic composite surface coating on the one or more surface regions.

In one aspect, the first precursor includes 3-mercaptopropyltrimethoxysilane and the second precursor includes tetraethyl orthosilicate.

In one aspect, the inorganic-organic composite surface coating includes a first lithium silicate ($Li_xSiO_y$) moiety, where $0 \leq x \leq 4$ and $0 \leq x \leq 2$ and a second mercaptoalkyl moiety.

In one aspect, the first precursor is selected from the group consisting of: 3-mercaptopropyltrimethoxysilane, 3-mercaptopropyltriethoxysilane (mercaptomethyl)methyldiethoxysilane, 3-mercaptopropylmethyldimethoxysilane, 11-mercaptoundecyloxytrimethylsilane, and combinations thereof and the second precursor is selected from the group consisting of: tetraethyl orthosilicate, tetramethyl orthosilicate, tetraisopropyl orthosilicate, and combinations thereof.

In one aspect, the first precursor and the second precursor are provided in a liquid admixture from which the first precursor and second precursor are vaporized.

In one aspect, the depositing of the first precursor and the second precursor occurs in a reaction chamber having an inert atmosphere.

In one aspect, a temperature in the reaction chamber is greater than or equal to about 90° C.

In one aspect, the negative electrode material includes:
(i) a metal film including lithium;
(ii) a plurality of particles, so that the inorganic-organic composite surface coating is applied to the plurality of particles that subsequently form the negative electrode; and
(iii) a pre-fabricated electrode layer and the inorganic-organic composite surface coating is applied to at least one surface of the pre-fabricated electrode layer.

In one aspect, the inorganic-organic composite surface coating deposited on the one or more surface regions provides greater than or equal to about 75% to less than or equal to about 100% surface area coverage of the negative electrode material.

In another variation, the present disclosure provides a method of making a negative lithium-containing electrode for an electrochemical cell that includes vaporizing a first precursor and a second precursor from a liquid admixture in a reaction chamber having an inert atmosphere. The first precursor includes a mercaptoalkyltrialkoxysilane and the second precursor includes an inorganic tetraalkyl orthosilane. The method includes depositing the first precursor and the second precursor onto one or more surface regions of a negative electrode material including lithium disposed in the reaction chamber. The first precursor and the second precursor react to form an inorganic-organic composite surface coating on the one or more surface regions.

In one aspect, the inorganic-organic composite surface coating includes a first lithium silicate ($Li_xSiO_y$) moiety, where 0≤x≤4 and 0≤y≤2, and a second mercaptopropyl moiety.

In one aspect, the first precursor is selected from the group consisting of: 3-mercaptopropyltrimethoxysilane, 3-mercaptopropyltriethoxysilane (mercaptomethyl)methyldiethoxysilane, 3-mercaptopropylmethyldimethoxysilane, 11-mercaptoundecyloxytrimethylsilane, and combinations thereof and the second precursor is selected from the group consisting of: tetraethyl orthosilicate, tetramethyl orthosilicate, tetraisopropyl orthosilicate, and combinations thereof.

In yet other variations, the present disclosure provides a negative lithium-containing electrode for an electrochemical cell that includes a negative electrode material including lithium having one or more exposed surface regions with an inorganic-organic composite surface coating disposed thereon. The inorganic-organic composite surface coating includes a first lithium silicate ($Li_xSiO_y$) moiety, where 0≤x≤4 and 0≤y≤2, and a second mercapto-containing moiety.

In one aspect, the second mercapto-containing moiety is selected from the group consisting of: a mercaptopropyl group, a mercaptomethyl group, a mercaptoundecyl group, and combinations thereof.

In one aspect, the inorganic-organic composite surface coating includes a first lithium silicate ($Li_xSiO_y$) moiety, where 0≤x≤4 and 0≤y≤2, and a second mercaptoalkyl moiety.

In one aspect, the inorganic-organic composite surface coating is disposed on the one or more surface regions provides greater than or equal to about 75% to less than or equal to about 100% surface area coverage of the negative electrode material.

In one aspect, the negative electrode material is a metal film including lithium and the inorganic-organic composite surface coating is applied to at least one surface of the metal film.

In one aspect, the negative electrode material is contained in a pre-fabricated electrode layer and the inorganic-organic composite surface coating is applied to at least one surface of the pre-fabricated electrode layer.

In one aspect, the negative electrode material includes a plurality of particles, so that the inorganic-organic composite surface coating is applied to the plurality of particles that subsequently form the negative electrode.

In one aspect, the inorganic-organic composite surface coating has a thickness of greater than or equal to about 2 nm to less than or equal to about 100 nm.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figures 5A, 5B, 5C, 5D, 5E, 5F, 5G, 5H:
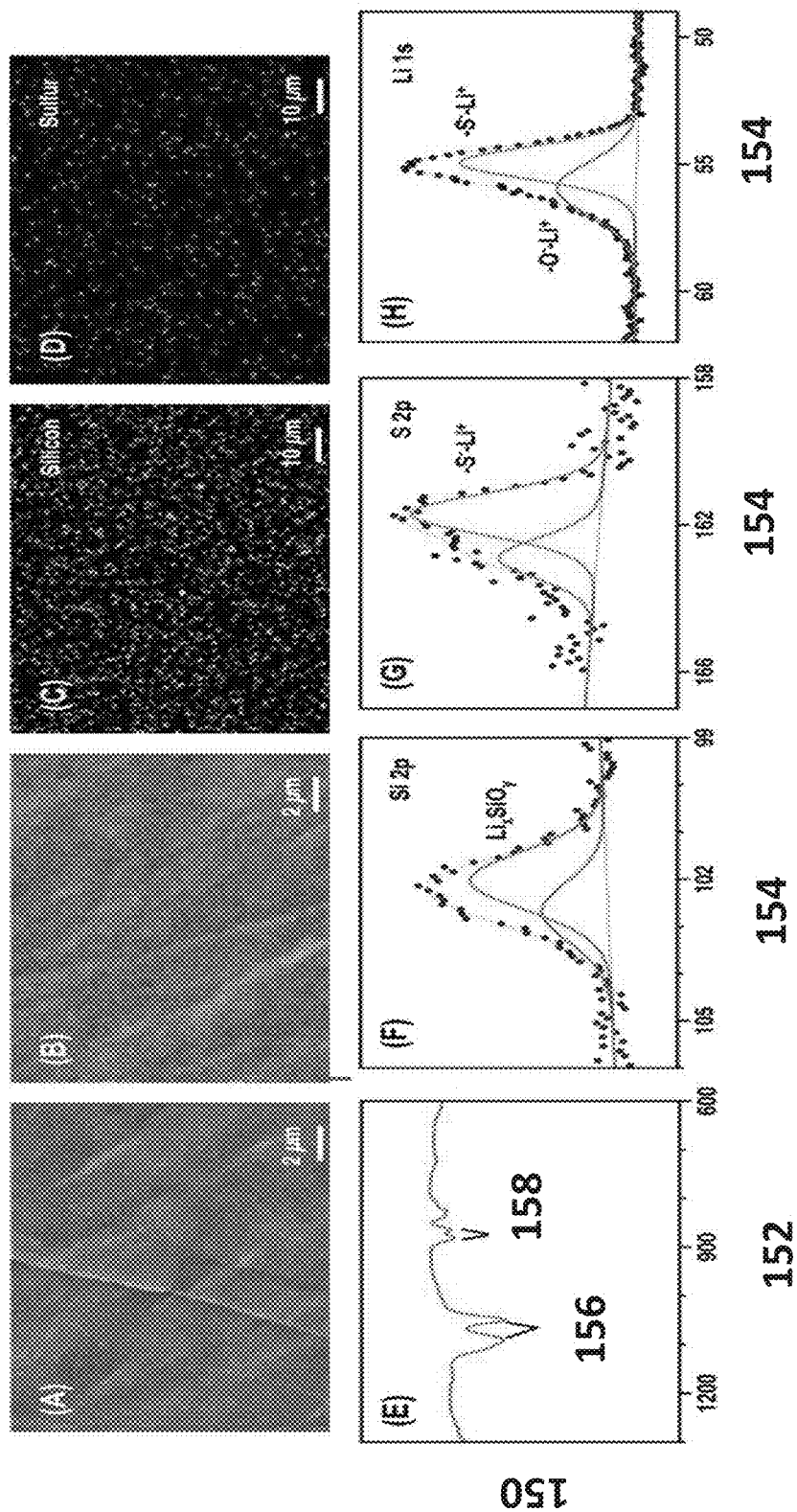

FIGS. 5A-5H show characterizations of the inorganic-organic composite coating on a negative electrode comprising lithium prepared in accordance with certain aspects of the present disclosure. Scanning electron microscopy images of lithium before (FIG. 5A) and after (FIG. 5B) vapor deposition. Scale bars are 2 micrometers. Elemental mapping images of the inorganic-organic composite surface coating show the uniform distributions of silicon (FIG. 5C) and sulfur (FIG. 5D) elements. Scale bars are 10 micrometers. FIG. 5E shows FTIR spectra of the inorganic-organic composite surface coating, indicating the formation of Si—O—Si bonds. XPS analysis of coating layer regarding (FIG. 5F) silicon 2p and (FIG. 5G) sulfur 2p and (FIG. 5H) lithium 1s, respectively. The y-axis is designated as 150 and shows transmittance (%). FIG. 5E includes an x-axis 152 of wave number ($cm^{-1}$) and FIGS. 5F-5G have an x-axis 154 of binding energy (eV).

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of" Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

As used herein, the terms "composition" and "material" are used interchangeably to refer broadly to a substance containing at least the preferred chemical compound, but which may also comprise additional substances or compounds, including impurities.

Example embodiments will now be described more fully with reference to the accompanying drawings.

The present technology pertains to improved electrochemical cells, especially lithium-ion or more particularly lithium-metal batteries, which may be used in vehicle applications. However, the present technology may also be used in other electrochemical devices; especially those that comprise lithium, such a lithium sulfur batteries, so that the discussion of a lithium-ion battery herein is non-limiting.

Figure 1:
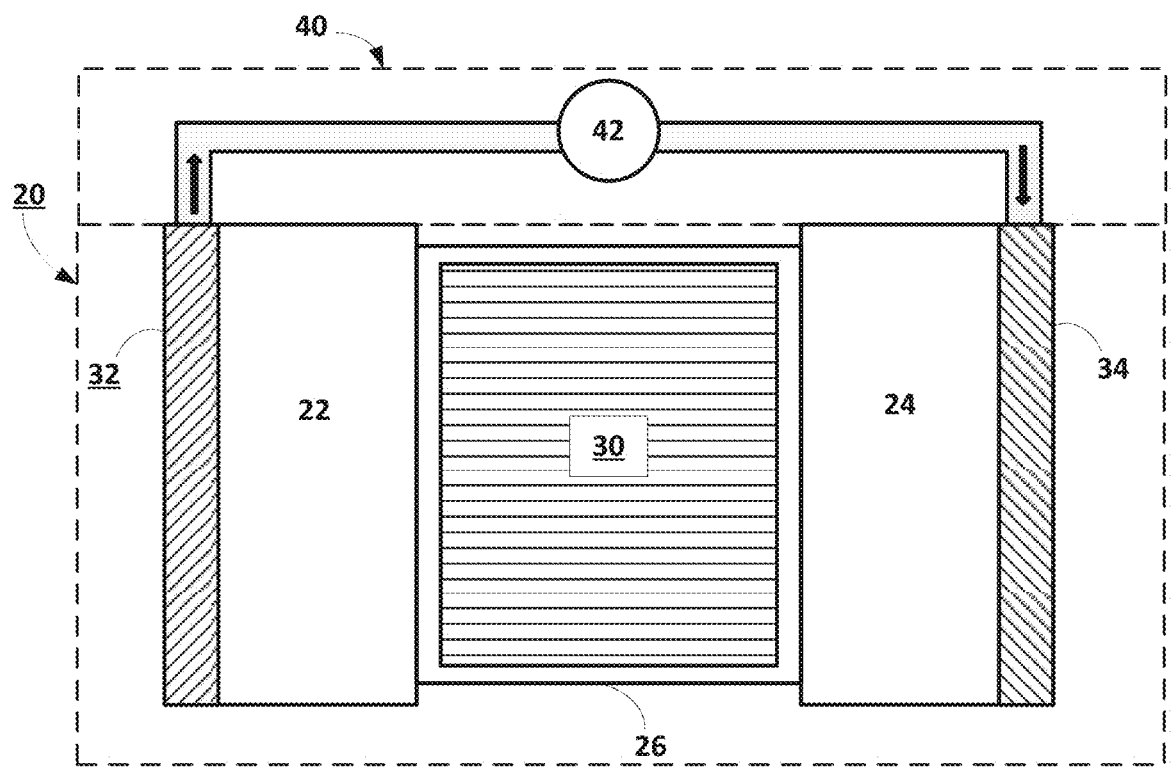
FIG. 1 is a schematic of an exemplary electrochemical battery cell including a lithium-containing negative electrode.

An exemplary and schematic illustration of a battery 20 that cycles lithium ion is shown in FIG. 1. Battery 20 includes a negative electrode 22, a positive electrode 24, and a porous separator 26 (e.g., a microporous or nanoporous polymeric separator) disposed between the two electrodes 22, 24. The porous separator 26 includes an electrolyte 30, which may also be present in the negative electrode 22 and positive electrode 24. A negative electrode current collector 32 may be positioned at or near the negative electrode 22 and a positive electrode current collector 34 may be positioned at or near the positive electrode 24. The negative electrode current collector 32 and positive electrode current collector 34 respectively collect and move free electrons to and from an external circuit 40. An interruptible external circuit 40 and load 42 connects the negative electrode 22 (through its current collector 32) and the positive electrode 24 (through its current collector 34).

The porous separator 26 operates as both an electrical insulator and a mechanical support, by being sandwiched between the negative electrode 22 and the positive electrode 24 to prevent physical contact and thus, the occurrence of a short circuit. The porous separator 26, in addition to providing a physical barrier between the two electrodes 22, 24, can provide a minimal resistance path for internal passage of lithium ions (and related anions) during cycling of the lithium ions to facilitate functioning of the battery 20.

The battery 20 can generate an electric current during discharge by way of reversible electrochemical reactions that occur when the external circuit 40 is closed (to connect the negative electrode 22 and the positive electrode 34) when the negative electrode 22 contains a relatively greater quantity of lithium. The chemical potential difference between the positive electrode 24 and the negative electrode 22 drives electrons produced at the negative electrode 22 through the external circuit 40 toward the positive electrode 24. Lithium ions, which are also produced at the negative electrode 22, are concurrently transferred through the electrolyte 30 and porous separator 26 towards the positive electrode 24. The electrons flow through the external circuit 40 and the lithium ions migrate across the porous separator 26 in the electrolyte 30 to the positive electrode 24, where they may be plated, reacted, or intercalated. The electric current passing through the external circuit 18 can be harnessed and directed through the load device 42 until the intercalated lithium in the negative electrode 22 is depleted and the capacity of the battery 20 is diminished. While in lithium-ion batteries, lithium intercalates and/or alloys in the electrode active materials, in a lithium sulfur battery, instead of intercalating or alloying, the lithium dissolves from the negative electrode and migrates to the positive electrode where it reacts/plates during discharge, while during charging, lithium plates on the negative electrode.

The battery 20 can be charged or re-energized at any time by connecting an external power source to the battery 20 to reverse the electrochemical reactions that occur during battery discharge. The connection of an external power source to the battery 20 compels the production of electrons and release of lithium ions from the positive electrode 25. The electrons, which flow back towards the negative electrode 22 through the external circuit 40, and the lithium ions, which are carried by the electrolyte 30 across the separator 26 back towards the negative electrode 22, reunite at the negative electrode 22 and replenish it with lithium for consumption during the next battery discharge cycle. As such, each discharge and charge event is considered to be a cycle, where lithium ions are cycled between the positive electrode 24 and negative electrode 22.

The external power source that may be used to charge the battery 20 may vary depending on the size, construction, and particular end-use of the battery 20. Some notable and exemplary external power sources include, but are not limited to, an AC wall outlet and a motor vehicle alternator. In many lithium-ion battery configurations, each of the negative current collector 32, negative electrode 22, the separator 26, positive electrode 24, and positive current collector 34 are prepared as relatively thin layers (for example, from several microns to a millimeter or less in thickness) and assembled in layers connected in electrical parallel arrangement to provide a suitable electrical energy and power package.

Furthermore, the battery 20 can include a variety of other components that while not depicted here are nonetheless known to those of skill in the art. For instance, the battery 20 may include a casing, gaskets, terminal caps, tabs, battery terminals, and any other conventional components or materials that may be situated within the battery 20, including between or around the negative electrode 22, the positive electrode 24, and/or the separator 26, by way of non-limiting example. As noted above, the size and shape of the battery 20 may vary depending on the particular application for which it is designed. Battery-powered vehicles and handheld consumer electronic devices, for example, are two examples where the battery 20 would most likely be designed to different size, capacity, and power-output specifications. The battery 20 may also be connected in series or parallel with other similar lithium-ion cells or batteries to produce a greater voltage output, energy, and power if it is required by the load device 42.

Accordingly, the battery 20 can generate electric current to a load device 42 that can be operatively connected to the external circuit 40. While the load device 42 may be any number of known electrically-powered devices, a few specific examples of power-consuming load devices include an electric motor for a hybrid vehicle or an all-electric vehicle, a laptop computer, a tablet computer, a cellular phone, and cordless power tools or appliances, by way of non-limiting example. The load device 42 may also be a power-generating apparatus that charges the battery 20 for purposes of storing energy. In certain other variations, the electrochemical cell may be a supercapacitor, such as a lithium-ion based supercapacitor.

With renewed reference to FIG. 1, the porous separator 26 may include, in certain instances, a microporous polymeric separator including a polyolefin, by way of non-limiting example. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of PE and PP, or multi-layered structured porous films of PE and/or PP. Commercially available polyolefin porous membranes 26 include CELGARD® 2500 (a monolayer polypropylene separator) and CELGARD® 2320 (a trilayer polypropylene/polyethylene/polypropylene separator) available from Celgard LLC.

When the porous separator 26 is a microporous polymeric separator, it may be a single layer or a multi-layer laminate, which may be fabricated from either a dry or wet process. For example, in one embodiment, a single layer of the polyolefin may form the entire microporous polymer separator 26. In other aspects, the separator 26 may be a fibrous membrane having an abundance of pores extending between the opposing surfaces and may have a thickness of less than a millimeter, for example. As another example, however, multiple discrete layers of similar or dissimilar polyolefins may be assembled to form the microporous polymer separator 26. Furthermore, the porous separator 26 may be mixed with a ceramic material or its surface may be coated in a ceramic material. For example, a ceramic coating may include alumina ($Al_2O_3$), silicon dioxide ($SiO_2$), or combinations thereof. Various conventionally available polymers and commercial products for forming the separator 26 are contemplated, as well as the many manufacturing methods that may be employed to produce such a microporous polymer separator 26.

The positive electrode 24 may be formed from a lithium-based active material that can sufficiently undergo lithium intercalation and deintercalation, alloying and dealloying, or plating and stripping, while functioning as the positive terminal of the battery 20. The positive electrode 24 electroactive materials may include one or more transition metals, such as manganese (Mn), nickel (Ni), cobalt (Co), chromium (Cr), iron (Fe), vanadium (V), and combinations thereof. Two exemplary common classes of known electroactive materials that can be used to form the positive electrode 24 are lithium transition metal oxides with layered structure and lithium transition metal oxides with spinel phase. For example, in certain instances, the positive electrode 24 may include a spinel-type transition metal oxide, like lithium manganese oxide ($Li_{(1+x)}Mn_{(2-x)}O_4$), where x is typically less than 0.15, including $LiMn_2O_4$ (LMO) and lithium manganese nickel oxide $LiMn_{1.5}Ni_{0.5}O_4$(LMNO). In other instances, the positive electrode 24 may include layered materials like lithium cobalt oxide ($LiCoO_2$), lithium nickel oxide ($LiNiO_2$), a lithium nickel manganese cobalt oxide ($Li(Ni_xMn_yCo_z)O_2$), where $0 \leq x \leq 1$, $0 \leq y \leq 1$, $0 \leq z \leq 1$, and $x+y+z=1$, including $LiMn_{0.33}Ni_{0.33}Co_{0.33}O_2$, a lithium nickel cobalt metal oxide ($LiNi_{(1-x-y)}Co_xM_yO_2$), where $0<x<1$, $0<y<1$ and M may be Al, Mn, or the like. Other known lithium-transition metal compounds such as lithium iron phosphate ($LiFePO_4$) or lithium iron fluorophosphate ($Li_2FePO_4F$) can also be used. In certain aspects, the positive electrode 24 may include an electroactive material that includes manganese, such lithium manganese oxide ($Li_{(1+x)}Mn_{(2-x)}O_4$), a mixed lithium manganese nickel oxide ($LiMn_{(2-x)}Ni_xO_4$), where $0 \leq x \leq 1$, and/or a lithium manganese nickel cobalt oxide (e.g., $LiMn_{1/3}Ni_{1/3}Co_{1/3}O_2$). In a lithium-sulfur battery, positive electrodes may have elemental sulfur as the active material or a sulfur-containing active material.

In certain variations, such active materials may be intermingled with an optional electrically conductive material and at least one polymeric binder material to structurally fortify the lithium-based active material along with an optional electrically conductive particle distributed therein. For example, the active materials and optional conductive materials may be slurry cast with such binders, like polyvinylidene difluoride (PVdF), ethylene propylene diene monomer (EPDM) rubber, or carboxymethoxyl cellulose (CMC), a nitrile butadiene rubber (NBR), lithium polyacrylate (LiPAA), sodium polyacrylate (NaPAA), sodium alginate, lithium alginate. Electrically conductive materials may include graphite, carbon-based materials, powdered nickel, metal particles, or a conductive polymer. Carbon-based materials may include by way of non-limiting example particles of KETCHEN™ black, DENKA™ black, acetylene black, carbon black, and the like. Examples of a conductive polymer include polyaniline, polythiophene, polyacetylene, polypyrrole, and the like. In certain aspects, mixtures of conductive materials may be used. The positive current collector 34 may be formed from aluminum or any other appropriate electrically conductive material known to those of skill in the art.

The negative electrode 22 includes an electroactive material as a lithium host material capable of functioning as a negative terminal of a lithium-ion battery. In various aspects, the electroactive material comprises lithium and may be lithium metal. The negative electrode 22 may thus include the electroactive lithium host material, such as lithium. In certain variations, the negative electrode 22 may optionally include an electrically conductive material, as well as one or more polymeric binder materials to structurally hold the lithium material together. Negative electrodes may comprise greater than or equal to about 50% to less than or equal to about 100% of an electroactive material (e.g., lithium particles or a lithium foil), optionally less than or equal to about 30% of an electrically conductive material, and a balance binder. For example, in one embodiment, the negative electrode 22 may include an active material including lithium metal particles intermingled with a binder material selected from the group consisting of: polyvinylidene difluoride (PVdF), ethylene propylene diene monomer (EPDM) rubber, or carboxymethoxyl cellulose (CMC), a nitrile butadiene rubber (NBR), lithium polyacrylate (LiPAA), sodium polyacrylate (NaPAA), sodium alginate, lithium alginate, and combinations thereof, by way of non-limiting example. In certain variations, the negative electrode 22 may be in the form of lithium metal, such as a metal film comprising lithium (e.g., lithium foil). Suitable additional electrically conductive materials may include carbon-based material or a conductive polymer. Carbon-based materials may include by way of non-limiting example, particles of KETCHEN™ black, DENKA™ black, acetylene black, carbon black, and the like. Examples of a conductive polymer include polyaniline, polythiophene, polyacetylene, polypyrrole, and the like. In certain aspects, mixtures of conductive materials may be used.

In certain variations, an electrode may be in the form of lithium metal, such as a lithium foil or film. In other variations, an electrode may be made by mixing the electrode active material, such as lithium particles, into a slurry with a polymeric binder compound, a non-aqueous solvent, optionally a plasticizer, and optionally if necessary, electrically conductive particles. The slurry can be mixed or agitated, and then thinly applied to a substrate via a doctor blade. The substrate can be a removable substrate or alternatively a functional substrate, such as a current collector (such as a metallic grid or mesh layer) attached to one side of the electrode film. In one variation, heat or radiation can be applied to evaporate the solvent from the electrode film, leaving a solid residue. The electrode film may be further consolidated, where heat and pressure are applied to the film to sinter and calendar it. In other variations, the film may be air-dried at moderate temperature to form self-supporting films. If the substrate is removable, then it is removed from the electrode film that is then further laminated to a current collector. With either type of substrate, it may be necessary to extract or remove the remaining plasticizer prior to incorporation into the battery cell.

In certain variations, pre-fabricated electrodes formed of electroactive material via the active material slurry casting described above can be directly coated via a vapor coating formation process to form a conformal inorganic-organic composite surface coating, as described further below. Thus, one or more exposed regions of the pre-fabricated negative electrodes comprising the electroactive material can be coated to minimize or prevent reaction of the electrode materials with components within the electrochemical cell to minimize or prevent lithium metal dendrite formation on the surfaces of negative electrode materials when incorporated into the electrochemical cell. In other variations, a plurality of particles comprising an electroactive material, like lithium metal, can be coated with an inorganic-organic composite surface coating. Then, the coated electroactive particles can be used in the active material slurry to form the negative electrode, as described above.

The negative electrode current collector 32 may be formed from copper or any other appropriate electrically conductive material known to those of skill in the art.

Each of the separator 26, the negative electrode 22, and the positive electrode 24 may include an electrolyte system 30, capable of conducting lithium ions between the negative electrode 22 and the positive electrode 24. The electrolyte system 30 may be a non-aqueous liquid electrolyte solution including a lithium salt and at least one additive compound dissolved in an organic solvent or a mixture of organic solvents.

A battery may thus be assembled in a laminated cell structure, comprising an anode layer, a cathode layer, and electrolyte/separator between the anode and cathode layers. The anode and cathode layers each comprise a current collector. A negative anode current collector may be a copper collector foil, which may be in the form of an open mesh grid or a thin film. The current collector can be connected to an external current collector tab. A protective bagging material covers the cell and prevents infiltration of air and moisture. Into this bag, an electrolyte is injected into the separator (and may also be imbibed into the positive and/or negative electrodes) suitable for lithium ion transport. In certain aspects, the laminated battery is further hermetically sealed prior to use.

In various aspects, the present disclosure provides a negative lithium-containing electrode for a rechargeable lithium-based electrochemical cell. The electrochemical cell includes a negative electrode material comprising lithium having exposed surface regions, for example, surface regions that are on a side that faces and is adjacent to the separator and is in contact with electrolyte. One or more of such exposed surface regions have a composite surface coating disposed thereon that includes both inorganic and organic materials that conduct lithium ions and help to suppress or minimize lithium dendrite formation and improve the cycling life of rechargeable lithium batteries. In this manner, next-generation high-energy rechargeable lithium metal batteries are contemplated. The inorganic-organic composite surface coating is a conformal hermetic coating deposited on the one or more surface regions of the negative electrode comprising lithium via vapor deposition methods, as will be described further below.

Figure 2:
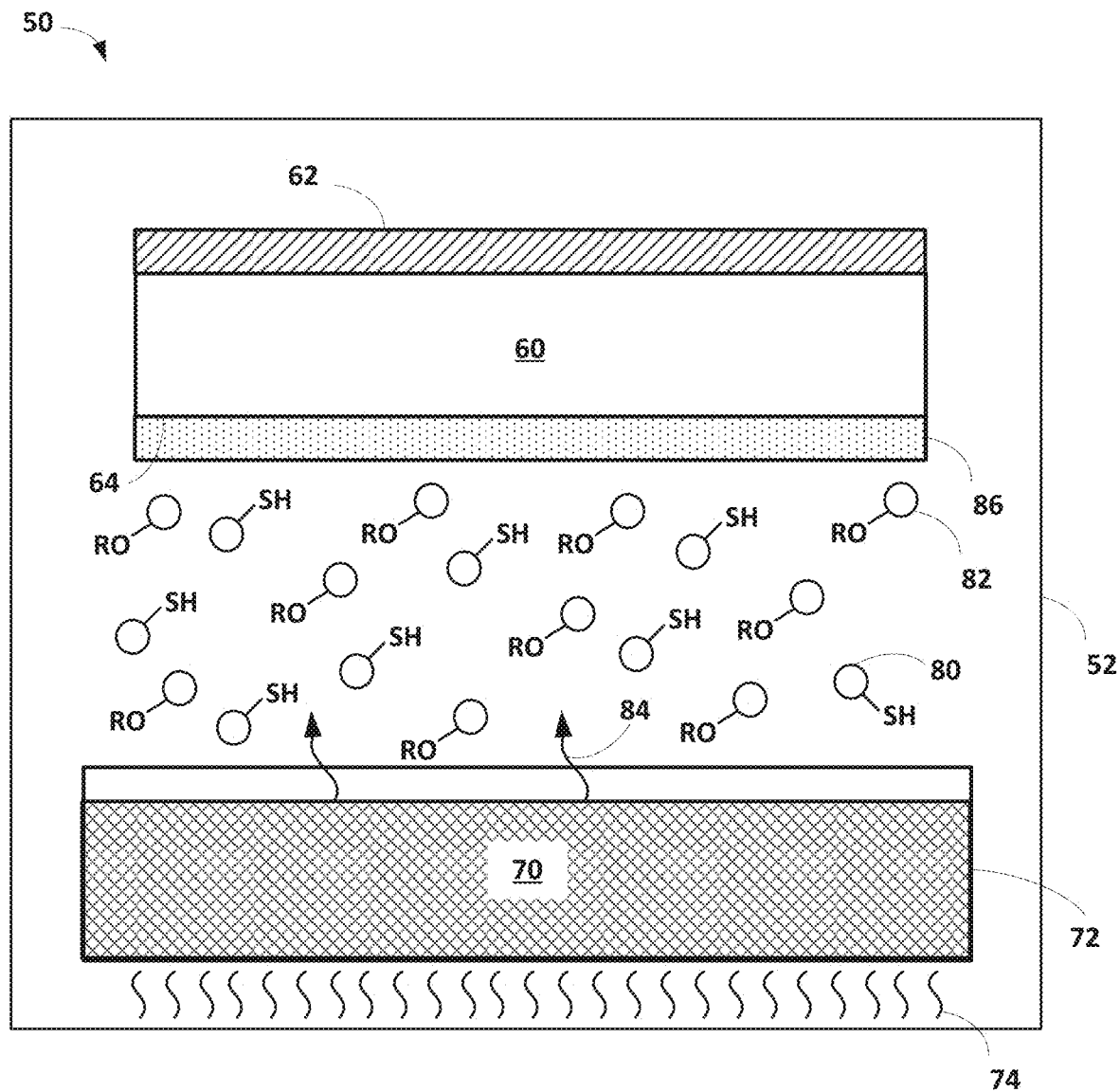
FIG. 2 shows a reactor in which a vapor deposition process according to certain aspects of the present disclosure is provided, where one or more surface regions of a negative electrode material comprising lithium are coated with an inorganic-organic composite surface coating.
Figure 3:
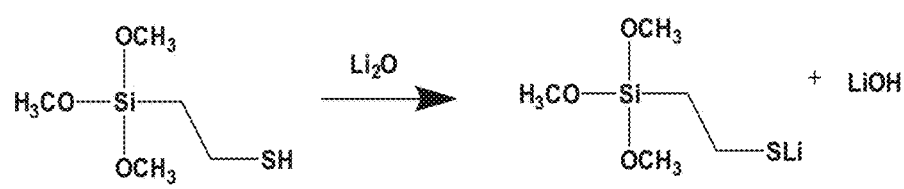
FIG. 3 shows exemplary reactions that occur when forming an inorganic-organic composite surface coating according to certain aspects of the present disclosure.
Figure 3:
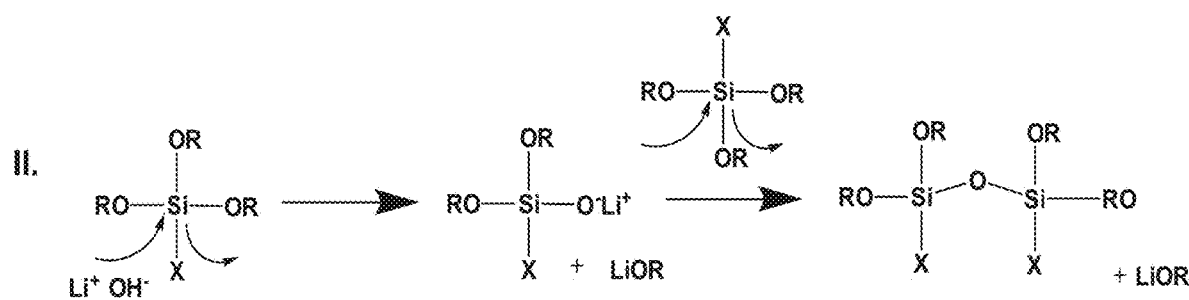

In certain aspects, the present disclosure provides a method of making a negative lithium-containing electrode for an electrochemical cell via a deposition process, which is generally represented in FIG. 2. A reactor 50 for vapor deposition is provided having a reaction chamber 52. A negative electrode material 60 comprising lithium is shown disposed on an optional substrate 62, such as a current collector, and has one or more exposed surface regions 64 of a negative electrode material 60. While not shown, the negative electrode material 60 may be disposed on a holder or stage for moving the substrate during deposition. A liquid admixture 70 is contained in an open receptacle 72 disposed in the reaction chamber 52. A heat source 74 applies heat to the liquid admixture 70 causing at least two precursors to volatilize into a vapor form. Notably, the two distinct precursors may be contained in separate chambers that are heated, however, the admixture of precursors in the liquid provides better mixing and distribution of the precursors as they are vaporized directed at the one or more exposed surface regions 64 of the negative electrode material 60 resulting in a more homogeneous inorganic-organic composite surface coating. In various aspects, an atmosphere 76 within the reaction chamber 52 is inert, for example, an argon atmosphere. The reactor 50 may use a dry room or glove box for the coating process. The atmosphere 76 may be substantially free of any moisture or water, for example, having less than or equal to about 0.5% by weight, optionally less than or equal to about 0.1% by weight, optionally less than or equal to about 0.05% by weight, and in certain preferred aspects, 0% by weight of water in the atmosphere.

The method includes depositing a first precursor 80 and a distinct second precursor 82 by heating the liquid admixture at a time and temperature that provides a predetermined flow rate of the vaporized first precursor 80 and vaporized second precursor 82. It should be noted that additional precursors may also be used, although only two distinct precursors are described in the present discussion. In certain variations, a temperature in the reaction chamber 52 is greater than or equal to about 90° C., optionally around 100° C. and at ambient pressures. The reactor 50 may include other controls and equipment not shown, including additional heaters, coolers, flow routing and valves, for controlling the amount of exposure of the substrate to the vapor source. The first precursor 80 and the second precursor 82 are thus directed towards the one or more exposed surface regions 64 of the negative electrode material 60, as shown by arrows 84. The first precursor 80 and the second precursor 82 thus react with the surface regions 64 and one another to form a conformal inorganic-organic composite surface coating 86. The surface regions 64 of the negative electrode material 60 comprising lithium may generally have active species, such as $Li_2O$ and LiOH along the surface. In certain aspects, the composite surface coating 86 covers all of the surface regions such that when the negative electrode material 60 is incorporated into an electrochemical cell and contacts electrolyte, it is protected by the composite surface coating 86 and helps to minimize or suppress formation of harmful lithium dendrites during discharging and charging.

The first precursor 80 comprises an organic moiety that is incorporated into the composite surface coating 86. In certain aspects, the first precursor 80 is an organic mercapto-containing silane, where the mercapto group is generally represented by the "S—H" in FIG. 2. The first precursor 80 may be a mercaptoalkyltrialkoxysilane, where the alkyl group attached to the mercapto group may include methyl ($CH_3$), ethyl ($C_2H_5$), propyl ($C_3H_7$), undecyl ($C_{11}H_{23}$), and the like. The alkoxy groups may include methoxy or ethoxy, by way of non-limiting example. In certain variations, the first precursor 80 may be selected from the group consisting of: 3-mercaptopropyltrimethoxysilane, 3-mercaptopropyltriethoxysilane (mercaptomethyl)methyldiethoxysilane, 3-mercaptopropylmethyldimethoxysilane, 11-mercaptoundecyltrimethylsilane. In certain variations, the first precursor 80 comprises 3-mercaptopropyltrimethoxysilane.

The second precursor 82 comprises an inorganic moiety that is incorporated into the composite surface coating 86. In certain aspects, the second precursor 82 is an inorganic silane. As shown in FIG. 2, the alkoxyl groups that are later hydrolyzed from the silane are generally represented by the "R—O" group in FIG. 2. The second precursor 82 may be an inorganic tetraalkyl orthosilane. The alkyl constituents forming part of the alkoxy attached to the silane may include methyl ($CH_3$), ethyl ($C_2H_5$), and propyl ($C_3H_7$) groups. In certain variations, the second precursor 82 is selected from the group consisting of: tetraethyl orthosilicate, tetramethyl orthosilicate, tetraisopropyl orthosilicate, and combinations thereof. In one variation, the second precursor 82 comprises tetraethyl orthosilicate.

In certain aspects, a ratio of the first precursor 80 to the second precursor 82 in the liquid admixture ranges from 0.5 to 2, where in certain variations the ratio is about 1 (or about 50% by volume of the first precursor 80 to about 50% by volume the second precursor 82). The deposition process may occur for greater than or equal to about 1 hour, optionally greater than or equal to about 2 hours, optionally greater than or equal to about 5 hours, and in certain aspects, optionally greater than or equal to about 8 hours. After depositing the an inorganic-organic composite surface coating, it may be subjected to a secondary heat treatment, for example, exposed to 120° C. for about 30 minutes.

Exemplary reactions that occur when forming an inorganic-organic composite surface coating according to certain aspects of the present disclosure. The first precursor may be 3-mercaptopropyltrimethoxysilane (MPS) and the second precursor may be tetraethyl orthosilicate (TEOS). In reaction I, the first precursor is 3-mercaptopropyltrimethoxysilane, which is shown to be catalyzed by $Li_2O$ (for example on the surface regions of the lithium negative electrode material) and which produces LiOH. Thus, $Li_2O$ reacts with the mercapto groups (—SH) from MPS and form —S$^-$—Li$^+$ bonds. Meanwhile, the moieties of methoxysilane (—Si—OCH$_3$, from MPS) and ethoxysilane (—Si—OCH$_2$CH$_3$, from TEOS) undergo hydrolyses and condensation reactions, generating a thin layer of lithium silicate ($Li_xSiO_y$) on the surface of LMAs (Reaction II). Such an inorganic-organic composite surface layer can serve as a robust lithium ion (Li$^+$) conductor, facilitating rapid transport of lithium ions at the interface between liquid metal anodes and electrolyte.

Figure 4:
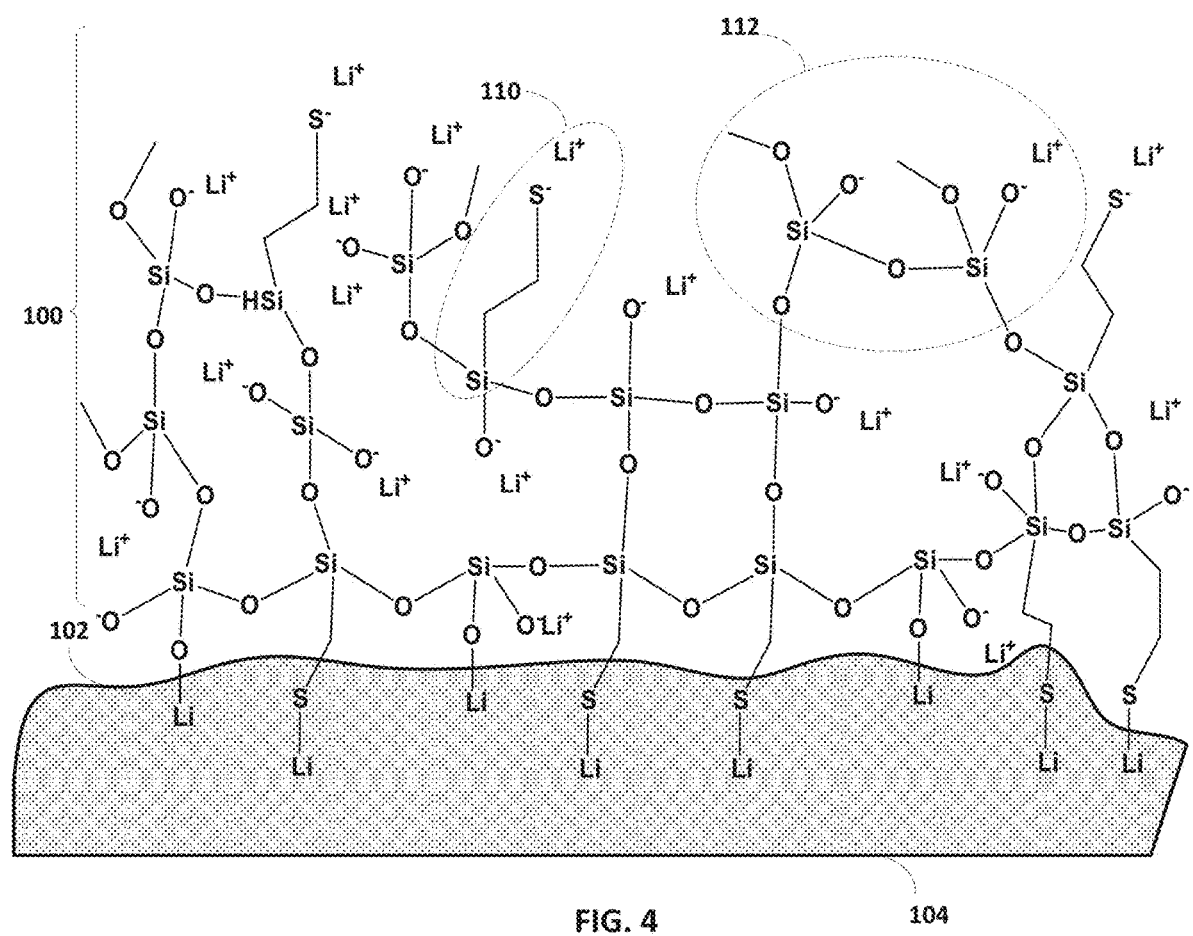
FIG. 4 shows a detailed view of a negative electrode material of lithium coated with an inorganic-organic composite surface coating having a first organic moiety and a second inorganic moiety prepared in accordance with certain aspects of the present disclosure.

FIG. 4 shows an exemplary inorganic-organic composite surface coating 100 formed on an exposed surface 102 of a negative electrode material 104. As can be seen, the first precursor and the second precursor have reacted with one another and the active groups on the exposed surface 102 to form the inorganic-organic composite surface coating 100. Generally, the inorganic-organic composite surface coating 100 includes both an organic moiety 110 in the form of a mercaptoalkyl moiety and an inorganic moiety 112 in the form of a lithium silicate ($Li_xSiO_y$), where $0 \leq x \leq 4$ and $0 \leq y \leq 2$, which notably includes some remaining alkoxy groups. A surface coating may include a plurality of distinct layers.

Given that the growth of lithium dendrites is a self-amplified process, the hermetic coverage of metallic lithium by the interfacial inorganic-organic composite surface coating 100 helps suppress the formation of dendritic structures. As a homogenous and self-limited process, the vapor deposition method enables the formation of a thin, compact and pinhole-free interfacial inorganic-organic composite surface coating 100 on lithium metal anodes that can hardly be achieved, if at all, by solution-based coating methods. The inorganic-organic composite surface coating 100 thus possesses the "hard" inorganic moiety 112 (e.g., $Li_xSiO_y$) that helps to block the growth of lithium dendrites and the "soft" organic moiety 110 (e.g., mercaptopropyl groups) to enhance the flexibility and robustness of the coating during operations. Furthermore, the inorganic-organic composite surface coating 100 permits uniform distribution of lithium-ion flux during operation of the electrochemical cell. $Li_x$-$SiO_y$ can serve as a Li$^+$ ion conductor to facilitate the transportation of lithium ions (Li$^+$) at the electrode/electrolyte interphase, while the formation of —S$^-$—Li$^+$ bonds between the inorganic-organic composite surface coating 100 and metallic lithium of the negative electrode 104 provides concurrent movement of lithium ions regardless of the volumetric changes in the electrode during lithium plating/stripping. Thus, the inorganic-organic composite surface coating 100 can move dynamically with lithium electrode surface due to the functional anchors regardless of the volumetric change of lithium metal anodes.

In certain variations, the inorganic-organic composite surface coating deposited on the one or more surface regions provides greater than or equal to about 75% surface area coverage of the negative electrode material. Notably, such a vapor deposition process desirably provides uniform and extensive surface coverage of the negative electrode active material. For example, the inorganic-organic composite surface coating may cover greater than or equal to about 80%, optionally greater than or equal to about 85%, optionally greater than or equal to about 90%, optionally greater than or equal to about 95%, optionally greater than or equal to about 97%, optionally greater than or equal to about 98%, optionally greater than or equal to about 99%, and in certain variations, optionally greater than or equal to about 99.5% of the exposed surface area of the electroactive material comprising lithium. The vapor deposition processes can thus provide good surface coverage, for example, covering up to 100% of the exposed surface area of the electrode due to the precursor vapor diffusing over the entire surface. In certain variations, the inorganic-organic composite surface coating may cover greater than or equal to about 75% to less than or equal to about 100% of the exposed surface area of the electroactive material comprising lithium.

In certain variations, the inorganic-organic composite surface coating has a thickness of less than or equal to about 100 nm, optionally less than or equal to about 90 nm, optionally less than or equal to about 80 nm, optionally less than or equal to about 70 nm, optionally less than or equal to about 60 nm, optionally less than or equal to about 50 nm, optionally less than or equal to about 40 nm, optionally less than or equal to about 30 nm, optionally less than or equal to about 20 nm, optionally less than or equal to about 10 nm, optionally less than or equal to about 5 nm, and in certain variations, optionally greater than or equal to about 2 nm to less than or equal to about 100 nm.

In accordance with the present teachings, surface coatings are used as an efficient way to resolve the problem of structural stress/strain and lithium dendrite formation in a lithium containing anode material of a rechargeable battery during discharge and recharge cycling, by incorporating a flexible material (e.g., organic mercapto moieties) and a rigid, higher strength material (e.g., inorganic siloxane groups) into the system that helps reduce mechanical stress, cracking, and/or fracture and suppresses or minimizes lithium dendrite growth during lithium migration. As a result, the growth of lithium dendrites has been effectively minimized or suppressed. Li—LiFePO$_4$ and Li—S batteries with coated lithium metal anodes as discussed below have demonstrated doubled cycling lifetime, as well as dramatically decreased capacity degradation rates. As such, this inorganic/organic composite coating provided by the present teachings can suppress or minimize lithium dendrite growth and improve cycling life for next-generation high-energy rechargeable lithium metal batteries.

In certain aspects, the present disclosure contemplates a negative lithium-containing electrode for an electrochemical cell. The electrochemical cell includes a negative electrode material comprising lithium having one or more exposed surface regions with an inorganic-organic composite surface coating disposed thereon comprising a first lithium silicate ($Li_xSiO_y$) moiety and a second mercapto-containing moiety.

In one aspect, the second mercapto-containing moiety is selected from the group consisting of: a mercaptopropyl group, a mercaptomethyl group, a mercaptoundecyl group, and combinations thereof.

In another aspect, the inorganic-organic composite surface coating comprises a first lithium silicate ($Li_xSiO_y$) moiety, where $0 \leq x \leq 4$ and $0 \leq x \leq 2$ and a second mercaptoalkyl moiety.

In yet another aspect, the inorganic-organic composite surface coating is disposed on the one or more surface regions provides greater than or equal to about 75% to less than or equal to about 100% surface area coverage of the negative electrode material, as described above.

The inorganic-organic composite surface coating has a thickness of greater than or equal to about 2 nm to less than or equal to about 100 nm, or any of the thicknesses discussed previously above.

In one aspect, the negative electrode material is a metal film comprising lithium and the inorganic-organic composite surface coating is applied to at least one surface of the metal film.

In a further aspect, the negative electrode material is contained in a pre-fabricated electrode layer and the inorganic-organic composite surface coating is applied to at least one surface of the pre-fabricated electrode layer.

In an alternative aspect, the negative electrode material comprises a plurality of particles, so that the inorganic-organic composite surface coating is applied to the plurality of particles that subsequently form the negative electrode.

Various embodiments of the inventive technology can be further understood by the specific examples contained herein. Specific Examples are provided for illustrative purposes of how to make and use the compositions, devices, and methods according to the present teachings and, unless explicitly stated otherwise, are not intended to be a representation that given embodiments of this technology have, or have not, been made or tested.

Example 1

Lithium chips representing a lithium-containing negative electrode are exposed to the vapor of 3-mercaptopropyltrimethoxysilane (MPS) and the second precursor may be tetraethyl orthosilicate (TEOS) (v:v ratio=1:1) at 100° C. and ambient pressure in an argon-filled glovebox for 8 hours, followed by a heat treatment at 120° C. for 30 minutes. After the vapor deposition, the morphology and homogeneity of the coating layer are characterized by scanning electron microscopy (SEM) and energy-dispersive X-ray spectroscopy (EDX). With the protective inorganic-organic composite surface coating, the roughness of lithium surface is significantly reduced (FIGS. 5A-5B). Elemental mapping images further reveal the homogenous distributions of silicon and sulfur elements on the surface, verifying the uniformity of the coating layer. FIGS. 5C-5D.

The chemical structure of the coating layer is first evaluated with Fourier transform infrared (FTIR) spectroscopy. To collect the coating layer, ethanol is used to dissolve the coated lithium metal anode (LMA). The FTIR spectra (FIG. 5E) illustrates the formation of Si—O—Si bonds, presenting its stretching mode designated at arrow 156 at 1092 $cm^{-1}$ and 1049 $cm^{-1}$, as well as its bending mode designated at arrow 158 at 880 $cm^{-1}$ and 864 $cm^{-1}$.

The binding states of each element are further analyzed with X-ray photoelectron spectroscopy (XPS). Silicon element exhibits a typical silicon $2p_{3/2}$ spectrum (FIG. 5F) at 101.6 eV, consistent with the formation of lithium silicate $Li_xSiO_y$. Sulfur atoms (FIG. 5G), originating from the mercapto groups, display a binding state at 161.3 eV, in accordance with —$S^-$—$Li^+$ bonds. Consistently, lithium is spectrum (FIG. 5H) illustrates two binding states at 54.6 eV and 55.6 eV, which are attributed to —$S^-$—$Li^+$ bond and —$O^-$—$Li^+$ bond, respectively. No metallic lithium)($Li^0$) at 53.4 eV is detected, indicating complete coverage of the lithium-metal surface by the protective coating. To estimate the thickness of the coating layer, the sample is pre-etched by ion gun equipped within the X-ray photoelectron spectrometer for 60 seconds and then analyzed. It is found that the $Li_xSiO_y$ peak at 101.6 eV disappears after etching for approximately 180 seconds, accompanied by the appearance of a metallic lithium peak at 53.4 eV. Calculated based on the etching rate (8.1 nm $min^{-1}$) and time, the thickness of the coating layer is around 24 nm.

Example 2

To investigate the interfacial stability of coated LMAs prepared in accordance with Example 1 above, "lithium plating/stripping" tests are carried out with two-electrode symmetric cell configuration. During galvanostatic cycling, metallic lithium is repetitively plated onto the working electrode and subsequently stripped away, while the cell voltages are recorded. 1 M $LiPF_6$ in EC/DEC (v:v=1:1) and 1 M LiTFSI in DOL/DME (v:v ratio=1:1) are selected as the representative electrolytes based on carbonate and ether, respectively. The amount of liquid electrolyte in each coin cell is precisely controlled at 40 µL.

Lithium symmetric cells are first cycled in the carbonate-based electrolyte under a current density of 0.5 mA $cm^{-2}$ with an areal capacity of 1.0 mAh $cm^2$. The uncoated LMA experiences a rapid evolution of overpotential, as well as severe voltage fluctuations, which is possibly caused by the formation of lithium dendrites and the continuous side-reactions between metallic lithium and electrolyte species. In contrast, the coated LMA presents an initial overpotential of 45 mV and demonstrates stable electrochemical behaviors with almost unaltered overpotential for at least 500 hours, corresponding to 125 cycles of lithium plating/stripping. Such behavior indicates a stable and uniform solid electrolyte interface (SEI) has been formed and dendrite growth has been effectively suppressed.

The morphological changes of uncoated and coated LMAs after cycling are probed with scanning electron microscopy (SEM). After 50 cycles (corresponding to 100 hours), the surface of uncoated LMA becomes porous with submicron-sized lithium dendrites covered by SEI. The repetitive formation of SEI consumes significant amounts of metallic lithium and electrolyte components. In addition, such structures can easily become physically isolated and electrochemical inactive via fracture or mechanical failure during lithium stripping. In contrast, the smooth surface of coated LMA prepared in accordance with certain aspects of the present disclosure is maintained with no formation of dendritic structures or pits. In addition, the individual contributions of MPS and TEOS are further investigated with either MPS- or TEOS-coated LMAs under the same testing conditions. Similar to the control group, dendritic structures are found on the porous surfaces of both MPS- and TEOS-coated LMAs. This observation suggests that both organic (flexibility) and inorganic moieties (toughness) are important for the formation of effective protective coating layers on LMAs. This synergistic effect largely contributes to the stable electrochemical processes and uniform lithium plating/stripping behaviors, translating to the ability for long-term and safe operation of rechargeable lithium batteries.

Example 3

In lithium-sulfur systems, the commonly used carbonate-based solvents are replaced by ether-based solvents due to the irreversible reactions between polysulfides and carbonates. To evaluate the possibility of using coated LMAs prepared in accordance with Example 1 in a lithium-sulfur system, lithium plating/stripping experiments are further performed with ether-based electrolyte. Voltage profiles of both lithium symmetric cells under a current density of 0.5 mA $cm^{-2}$ are observed. Compared with the uncoated LMA, the coated anode exhibits significantly enhanced electrochemical stability. During the first 900 hours, the overpotential of uncoated LMA gradually increases from 26.5 mV to 757 mV, suggesting a great increase of resistance caused by the continuous degradation of electrolyte on LMAs. After that, the cell experiences severe voltage fluctuations, as well as cell failure.

In comparison, the coated LMA shows excellent electrochemical stability with a negligible evolution of overpotential: from 17 mV to 31 mV after 1000 hours. Such superior electrochemical stability indicates the excellent SEI has been formed with the hermetic coating of metallic lithium by inorganic-organic composites. The minimum exposure of lithium surface to liquid electrolyte successfully inhibits the side-reactions between metallic lithium and electrolyte species, leading to the stable electrochemical behavior of LMAs.

After repetitive lithium plating/stripping, the surface of uncoated LMA becomes rough with needle-like nanostructures, indicating the formation of lithium dendrites. Furthermore, the uneven morphology may further induce the generation of non-uniform electric field on the surface, stimulate the growth of dendritic structures during lithium electrodeposition, and eventually result in internal short-circuit. For the coated LMA, a smooth and intact surface with a grain size around 2 μm is maintained, which is consistent with the stable electrochemical behavior in galvanostatic cycling.

Example 4

Successful operation of LMAs would directly benefit the development of advanced rechargeable lithium batteries with high energy density. Replacing graphite anode in conventional lithium-ion batteries (LIBs) with LMAs could dramatically enhance its energy density. To evaluate the electrochemical performance and compatibility of coated LMAs with conventional cathodes in LIBs, Li—LiFePO$_4$ cells are constructed with carbonate-based electrolyte and cycled at 0.5 C rate (1 C=170 mAh g$^{-1}$). With a mass loading of LiFePO$_4$ at 5 mg cm$^2$, the current density and areal capacity are around 0.85 mA cm$^{-2}$ and 0.65 mAh cm$^{-2}$ for LMAs, respectively.

With the coating layer facilitating the transportation of Li$^+$ at the interface, the voltage polarization between charging and discharging plateaus is significantly reduced from 374 mV to 268 mV. Meanwhile, the faster reaction kinetics enhances the utilization of active materials and results in a higher specific capacity of 137.9 mAh g$^{-1}$ (vs. 124.9 mAh g$^{-1}$ of control cell). Galvanostatic cycling performance of both cells is also compared. Calculated based on the mass of LiFePO$_4$, the cell with coated LMA exhibits a reversible capacity of 103.6 mAh g$^{-1}$ after 500 cycles. The degradation rate of specific capacity is as low as 0.057% per cycle. Moreover, the coulombic efficiency of the cell is retained at 99.87% throughout cycling. In contrast, the cell with uncoated LMA exhibits comparable electrochemical behaviors with slightly lower specific capacity during the first 150 cycles; however, it suffers from dramatically reduced specific capacity and coulombic efficiency after 200 cycles.

Considering the identical cathodes used in both cells, the degradation of cell performance is mainly caused by the degradation of LMAs, more specifically, the formation of lithium dendrites and the severe side-reactions between metallic lithium and electrolyte species. With the incorporation of conformal inorganic-organic composite surface coating in accordance with certain aspects of the present disclosure, the electrochemical kinetics and stability of Li—LiFePO$_4$ cells are significantly improved, resulting in dramatically extended cycling life (greater than 500 cycles versus 200 cycles) and cycling stability.

Example 5

In lithium sulfur (Li—S) electrochemical cells, the side-reactions between LMAs and electrolyte species are more complicated owing to the co-existence of lithium polysulfides (Li$_2$S$_n$, =4-8). Lithium polysulfides are a series of soluble intermediate species formed in sulfur cathodes. Due to its high solubility and reactivity, polysulfide anions (S$_n^{2-}$) tend to migrate toward the anode and react with metallic lithium during cycling. While some studies suggest the suppression of lithium dendrites in the presence of polysulfide anions, the ionic and electronic insulating Li$_2$S/Li$_2$S$_2$ layer deposited on LMAs dramatically impedes the charge transport, leading to sluggish reaction kinetics and large cell polarizations. Moreover, the back-and-forth shuttling of S$_n^{2-}$ between two electrodes can generate an internal short-circuit and result in low coulombic efficiency.

To examine the adaptation of the aforementioned coated LMAs in lithium-sulfur system, Li—S cells are constructed with coated or uncoated LMAs in 1 M LiTFSI and 1 wt. % LiNO$_3$ in DOL/DME (v:v ratio=1:1) and tested at 0.3 C rate (1 C=1675 mAh g$^{-1}$), which corresponds to a current density of 1 mA cm$^{-2}$ and an areal capacity of 2.15 mAh cm$^{-2}$ for LMAs. The polarization of a cell with coated LMA prepared in accordance with certain aspects of the present disclosure is much lower comparing to that with uncoated LMA (233 mV versus 300 mV). In terms of electrochemical performance, both cell exhibit similar initial specific capacities (1088 mAh g$^{-1}$ vs. 1072 mAh g$^{-1}$) and degradation rates during the first 100 cycles.

However, the difference in electrochemical performances becomes more pronounced afterward. The sulfur cathode with coated LMA maintains a reversible capacity of 693 mAh g after 300 cycles with an average coulombic efficiency of 96.6%. In comparison, the capacity of cell with uncoated LMA starts to deteriorate rapidly after 100 cycles. Moreover, the cell encounters cell failure after 173 cycles due to dendrite-induced short-circuit.

Example 6

LiNO$_3$ additive in the above-studied Li—S cells helps to passivate the surface of LMAs, which is commonly used in lithium-sulfur system. However, such passivation effect would fade out once LiNO$_3$ is consumed. To simulate the performance of Li—S cells upon fully consumption of LiNO$_3$, both coated and uncoated LMAs are cycled in symmetric cells with LiNO$_3$-containing electrolyte for 5 cycles, disassembled and rinsed with DOL/DME for 3 times. The harvested LMAs are cycled with new sulfur electrodes in LiNO$_3$-free electrolyte (1 M LiTFSI in DOL/DME). The electrochemical behavior of these Li—S cells is evaluated with galvanostatic cycling at 0.3 C rate. The cell with coated LMA exhibits an initial capacity of 1541 mAh g$^{-1}$ and an initial coulombic efficiency of 92.6%. After cycling for 1000 cycles, the cell maintained 518 mAh g$^{-1}$ with an average coulombic efficiency of 95.3%. In contrast, the cell with uncoated LMA only delivers an initial capacity of 726 mAh g$^{-1}$ with an initial coulombic efficiency of 91.8%, which decreases to 64.4% after cycling. The average coulombic efficiency of the cell with uncoated LMA is much lower than that with coated LMA (77% versus 95.3%). These results clearly suggest that the conformal inorganic-organic composite surface coating endows rechargeable lithium-sulfur batteries with significantly enhanced electrochemical stability and prolonged cycling life (greater than 300 cycles versus 173 cycles). Further, such conformal inorganic-organic composite surface coatings work effectively for both carbonate-based and ether-based electrolytes. Compatibility of the electrolyte and any additives in the electrolyte is a significantly diminished concern for a negative electrode material comprising lithium are coated with an inorganic-organic composite surface coating according to certain aspects of the present teachings.

Example 7

Currently, the occurrence of side-reactions between LMAs and electrolyte species is one of the major issues associated with rechargeable lithium batteries. To investigate this process, LMAs are harvested from Li—S cells, which are cycled at 0.3 C rate for 150 cycles and interrupted at fully charged state (2.8 V v. Li$^+$/Li). The valence states of carbon, fluorine, nitrogen and silicon atoms are assessed with XPS. Both carbon 1s spectra present in five binding states at 292.6 eV, 289.7 eV, 288.3 eV, 286.3 eV and 284.5 eV, corresponding to —CF$_3$, —O—C=O, —C=O, —C—O and —C—C— groups, respectively. Among these components, —CF$_3$ group can be assigned to LiTFSI, while —O—C=O, —C=O, —C—O and —C—C— groups are mainly originated from the decomposition products of organic solvents. The relative amounts of decomposition products are 98.1% for uncoated LMA and 90.1% for coated LMA, indicating that the side-reactions are effectively suppressed by the coating layer. Meanwhile, both fluorine 1s spectra exhibit two valence states at 688.4 eV and 684.4 eV, which can be attributed to —CF$_3$ group and LiF, respectively. In this context, LiF results from the decomposition of LiTFSI. Similarly, the relative amount of LiF is much higher for the uncoated LMA (50.2% vs. 12.8%), which is consistent with the result of carbon species.

On the other hand, the nitrogen species on these two LMAs are not identical. For uncoated LMA, there are five binding states at 403.7 eV, 400.6 eV, 399.2 eV, 398.2 eV and 396.8 eV, which can be assigned to —NO, —N=C, —N—SO$_2$— (as in LiTFSI), LiN$_3$, and —NH$_x$ groups, respectively. In contrast, the coated LMA presents five bindings states at 407.4 eV, 403.8 eV, 399.3 eV, 398.2 eV and 396.9 eV, corresponding to —NO$_x$ (as in LiNO$_3$), —NO, —N—SO$_2$—, LiN$_3$, and —NH$_x$, respectively (FIG. 4E). The consumption of LiNO$_3$ and LiTFSI, accompanied by the formation of N—O and N=C groups on uncoated LMA, reveals the rapid decomposition of lithium salts and organic solvents during galvanostatic cycling. For coated LMA, such processes are effectively inhibited. More importantly, due to the high stability of Li$_x$SiO$_y$ against metallic lithium and the strong binding between them, the structure of Li$_x$SiO$_y$ (at 101.6 eV, FIG. 6H) is well maintained even after the repetitive lithium plating/stripping, as well as long-term exposure to organic solvents and polysulfides.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of making a negative lithium-containing electrode for an electrochemical cell, the method comprising:
    depositing a first precursor and a second precursor in a vapor deposition process onto one or more surface regions of a negative electrode material comprising lithium, wherein the first precursor and the second precursor react to form an inorganic-organic composite surface coating on the one or more surface regions, wherein the first precursor comprises an organic mercapto-containing silane and the second precursor comprises an inorganic silane, and the inorganic-organic composite surface coating comprises a first lithium silicate (Li$_x$SiO$_y$) moiety, where $0 \leq x \leq 4$ and $0 \leq y \leq 2$.

2. The method of claim 1, wherein the first precursor comprises 3-mercaptopropyltrimethoxysilane and the second precursor comprises tetraethyl orthosilicate.

3. The method of claim 1, wherein the inorganic-organic composite surface coating further comprises a second mercaptoalkyl moiety.

4. The method of claim 1, wherein the first precursor is selected from the group consisting of: 3-mercaptopropyltrimethoxysilane, 3-mercaptopropyltriethoxysilane (mercaptomethyl)methyldiethoxysilane, 3-mercaptopropylmethyldimethoxysilane, 11-mercaptoundecyloxytrimethylsilane, and combinations thereof and the second precursor is selected from the group consisting of: tetraethyl orthosilicate, tetramethyl orthosilicate, tetraisopropyl orthosilicate, and combinations thereof.

5. The method of claim 1, wherein the first precursor and the second precursor are provided in a liquid admixture from which the first precursor and second precursor are vaporized.

6. The method of claim 1, wherein the depositing of the first precursor and the second precursor occurs in a reaction chamber having an inert atmosphere.

7. The method of claim 6, wherein a temperature in the reaction chamber is greater than or equal to about 90° C.

8. The method of claim 1, wherein the negative electrode material comprises:
    (i) a metal film comprising lithium;
    (ii) a plurality of particles, so that the inorganic-organic composite surface coating is applied to the plurality of particles that subsequently form a negative electrode; and
    (iii) a pre-fabricated electrode layer and the inorganic-organic composite surface coating is applied to at least one surface of the pre-fabricated electrode layer.

9. The method of claim 1, wherein the inorganic-organic composite surface coating deposited on the one or more surface regions provides greater than or equal to about 75% to less than or equal to about 100% surface area coverage of the negative electrode material.

10. A negative lithium-containing electrode for an electrochemical cell, comprising a negative electrode material comprising lithium having one or more exposed surface regions with an inorganic-organic composite surface coating disposed thereon comprising a first lithium silicate (Li$_x$SiO$_y$) moiety, where $0 \leq x \leq 4$ and $0 \leq y \leq 2$, and a second mercapto-containing moiety.

11. The negative lithium-containing electrode of claim 10, wherein the second mercapto-containing moiety is selected from the group consisting of: a mercaptopropyl group, a mercaptomethyl group, a mercaptoundecyl group, and combinations thereof.

12. The negative lithium-containing electrode of claim 10, wherein the inorganic-organic composite surface coating comprises a first lithium silicate (Li$_x$SiO$_y$) moiety, where $0 \leq x \leq 4$ and $0 \leq y \leq 2$, and a second mercaptoalkyl moiety.

13. The negative lithium-containing electrode of claim 10, wherein the inorganic-organic composite surface coating is disposed on the one or more exposed surface regions provides greater than or equal to about 75% to less than or equal to about 100% surface area coverage of the negative electrode material.

14. The negative lithium-containing electrode of claim 10, wherein the negative electrode material is a metal film comprising lithium and the inorganic-organic composite surface coating is applied to at least one surface of the metal film.

15. The negative lithium-containing electrode of claim 10, wherein the negative electrode material is contained in a pre-fabricated electrode layer and the inorganic-organic composite surface coating is applied to at least one surface of the pre-fabricated electrode layer.

16. The negative lithium-containing electrode of claim 10, wherein the negative electrode material comprises a plurality of particles, so that the inorganic-organic composite surface coating is applied to the plurality of particles that subsequently form the negative lithium-containing electrode.

17. The negative lithium-containing electrode of claim 10, wherein the inorganic-organic composite surface coating has a thickness of greater than or equal to about 2 nm to less than or equal to about 100 nm.

18. The negative lithium-containing electrode of claim 10, wherein the inorganic-organic composite surface coating is disposed using a vapor deposition process.

19. The negative lithium-containing electrode of claim 10, wherein the inorganic-organic composite surface coating is a hermetic, pinhole-free interfacial inorganic-organic composite surface coating.

20. The negative lithium-containing electrode of claim 10, wherein the inorganic-organic composite surface coating uniformly coats the one or more exposed surface regions of the negative electrode material.

* * * * *